US007369329B2

(12) United States Patent
Martynov et al.

(10) Patent No.: US 7,369,329 B2
(45) Date of Patent: May 6, 2008

(54) PRODUCING DISTINGUISHABLE LIGHT IN THE PRESENCE OF AMBIENT LIGHT

(75) Inventors: Yourii Martynov, Eindhoven (NL); Emanuel Stassar, Sprang Capelle (NL)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 0 days.

(21) Appl. No.: 11/429,535

(22) Filed: May 4, 2006

(65) Prior Publication Data

US 2007/0258153 A1 Nov. 8, 2007

(51) Int. Cl.
*G02B 17/00* (2006.01)

(52) U.S. Cl. ..................................................... 359/726

(58) Field of Classification Search ................ 359/722, 359/723, 708, 710, 712, 726; 362/244, 496, 362/335-336, 545

See application file for complete search history.

(56) References Cited

U.S. PATENT DOCUMENTS

2004/0037076 A1* 2/2004 Katoh et al. ................ 362/235
2006/0239006 A1* 10/2006 Chaves et al. .............. 362/294

* cited by examiner

*Primary Examiner*—Alicia M Harrington
(74) *Attorney, Agent, or Firm*—Patent Law Group LLP; Brian D. Ogonowsky

(57) ABSTRACT

A process and apparatus for producing distinguishable light, in the presence of ambient light is disclosed. The process involves admitting light in a first wavelength band through a first light admission port into a first optical cavity at least partially defined by a first reflector operably configured to reflect light out of the first optical cavity. The process also involves filtering ambient light reflected into the first optical cavity and entering and exiting a first space defined about the first light admission port such that ambient light outside the first wavelength band is attenuated on entry and exit from the first space.

40 Claims, 4 Drawing Sheets

PRODUCING DISTINGUISHABLE LIGHT IN THE PRESENCE OF AMBIENT LIGHT

BACKGROUND OF THE INVENTION

1. Field of Invention

This invention relates to lighting assemblies and more particularly to apparatus and processes for producing distinguishable light in the presence of ambient light.

2. Description of Related Art

High brightness light emitting diodes (LEDs) are being used more frequently in various applications including automotive signal lights or taillights, for example. LEDs directly emit colored light without any additional colored filters, which allows automobile designers to craft signal lamp designs with clear outer lenses and reflectors which tend to be more attractive aesthetically than conventional designs. Unfortunately, the use of clear outer lenses and reflectors in signal lamp designs can result in poor daytime visibility. This is because light from the sun can enter the lamp housing and be reflected with little or no losses. This light mixes with light from the LED signal source and to an external observer, this mixed light appears less color saturated or "washed out" and thus, less visible. Other drivers may have difficulty seeing signal lights suffering from this problem and this can create a traffic hazard.

Typical methods for improving daytime visibility of signal lights involves the use of colored external lenses, the use of an optical structure on an outer lens or a matte or structured outer lens or reflector. Each of these methods has limited effectiveness and significantly changes the appearance of the signal lamp in a way that may be objectionable to automobile designers.

SUMMARY OF THE INVENTION

In accordance with one aspect of the invention, there is provided a process for producing distinguishable light, in the presence of ambient light. The process involves admitting light in a first wavelength band through a first light admission port into a first optical cavity at least partially defined by a first reflector operably configured to reflect light out of the first optical cavity. The process also involves filtering ambient light entering and exiting a first space defined about the first light admission port such that ambient light outside the first wavelength band is attenuated on entry and exit from the first space.

Admitting light may involve admitting light from a light emitting diode in the space.

Filtering may involve causing ambient light reflected into the space to pass through a filter defining the space.

Filtering may involve causing ambient light reflected into the space to pass through a filter surrounding the space.

Causing ambient light to pass through a filter may involve causing the ambient light to pass through a filter positioned between the reflector and the light admission port.

Causing ambient light to pass through a filter may involve causing ambient light impinging upon an inner surface of an optical filter medium extending about the first light admission port to pass through the medium and be reflected back through the medium by a reflective coating on an outer surface of the medium.

Causing ambient light to pass through a filter may involve causing the ambient light to pass through a filter having a shape generally complementary to the reflector.

Causing ambient light to pass through a filter may involve causing the ambient light to pass through a filter having a surface in contact with a surface of the reflector.

Causing ambient light to pass through a filter may involve causing the ambient light to pass through a filter adjacent the light admission port.

The process may further involve admitting light in a second wavelength band through a second light admission port into a second optical cavity at least partially defined by a second reflector operably configured to reflect light out of the second optical cavity and filtering ambient light reflected into the second optical cavity and entering and exiting a second space defined about the second light admission port such that ambient light outside the second wavelength band is attenuated on entry and exit from the second space.

Admitting light in the first and second wavelength bands may involve admitting light into first and second optical cavities positioned generally coaxially with each other.

In accordance with another aspect of the invention, there is provided an apparatus for producing distinguishable light, in the presence of ambient light. The apparatus includes a first reflector at least partially defining a first optical cavity, the first reflector being operably configured to reflect light out of the first optical cavity, a first light admission port operably configured to admit light in a first wavelength band into the first optical cavity and a first filter operably configured to filter ambient light entering and exiting a first space defined about the first light admission port such that ambient light outside the first wavelength band is attenuated on entry and exit from the first space.

The apparatus may further include a first light emitting diode in the first light admission port for emitting the light in the first wavelength band into the first space.

The first filter may define the first space.

The first filter may surround the first space.

The first filter may be positioned between the reflector and the first light admission port.

The first filter may be positioned adjacent the first reflector.

The first filter may have a first shape generally complementary to the first reflector.

The first filter may have a first surface in contact with a surface of the first reflector.

The first filter may be positioned adjacent the first light admission port.

The first filter may include a first optical medium.

The first filter may include a first optical filter medium extending about the first light admission port and having a first outer surface facing generally away from the first light admission port.

The first outer surface may have a generally paraboloidal shape.

The first reflector may include a first reflective coating on the first outer surface such that ambient light impinging upon an inner surface of the first optical filter medium passes through the medium and then is reflected back through the medium by the first reflective coating.

The apparatus may further include a second reflector positioned coaxially with the first reflector, the second reflector at least partially defining a second optical cavity, the second reflector being operably configured to reflect light out of the second optical cavity, a second light admission port operably configured to admit light in a second wavelength band into the second optical cavity, a second filter operably configured to filter ambient light entering and exiting a second space defined about the second light admission port such that ambient light outside the second wavelength band is attenuated on entry and exit from the second space.

The apparatus may further include a second light emitting diode in the second light admission port for emitting the light in the second wavelength band into the second space.

The second filter may define the second space.

The second filter may surround the second space.

The second filter may be positioned between the second reflector and the second light admission port.

The second filter may be positioned adjacent the second light admission port.

The second filter may include a second optical medium.

Other aspects and features of the present invention will become apparent to those ordinarily skilled in the art upon review of the following description of specific embodiments of the invention in conjunction with the accompanying figures.

BRIEF DESCRIPTION OF THE DRAWING

In drawings which illustrate embodiments of the invention.

DETAILED DESCRIPTION

Figure 1:
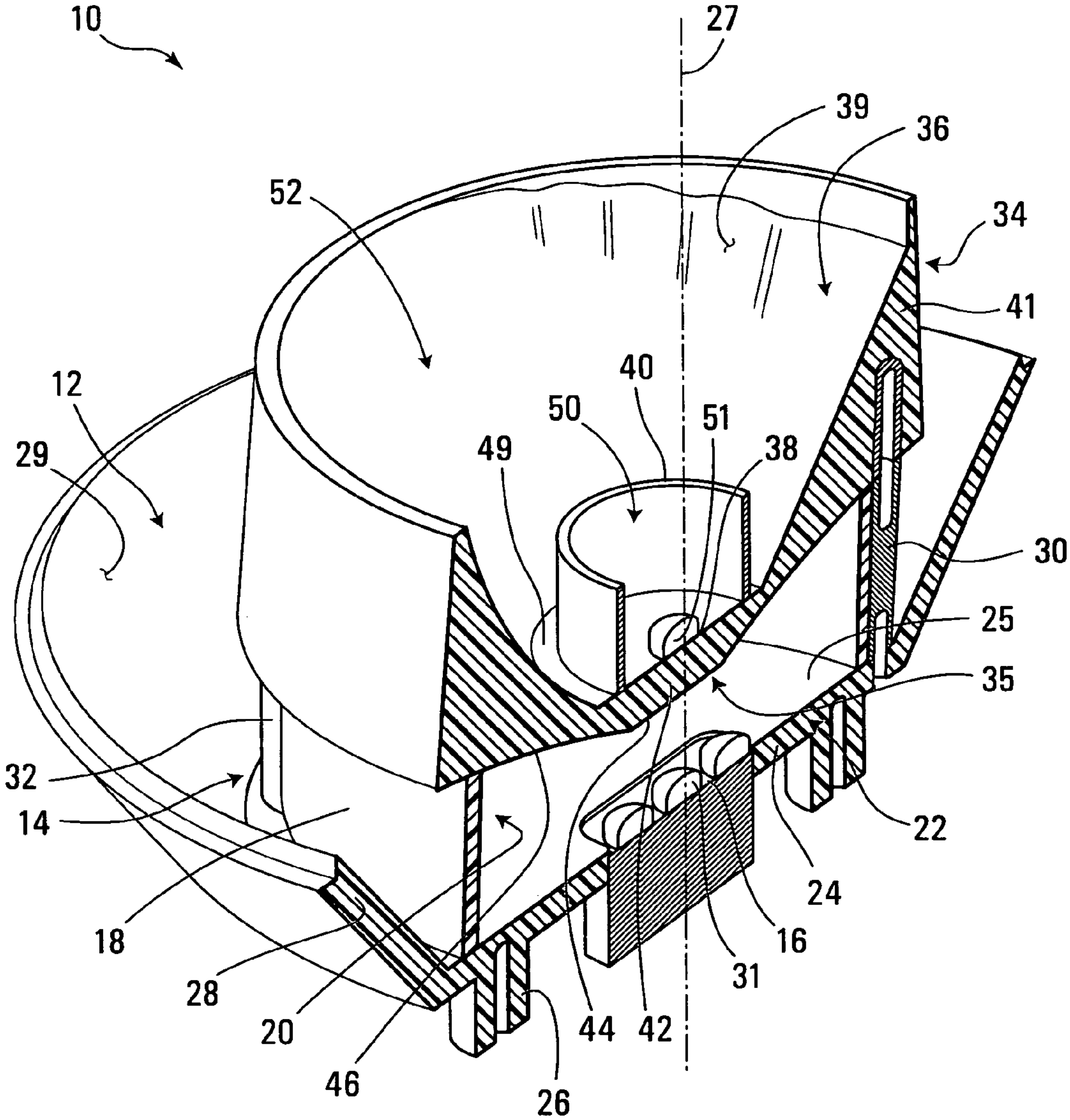
FIG. 1 is a cutaway perspective view of a lighting apparatus according to a first embodiment of the invention.

Referring to FIG. 1, a lighting apparatus for producing distinguishable light in the presence of ambient light, in accordance with a first embodiment of the invention is shown generally at 10. The apparatus 10 includes a first reflector shown generally at 12 defining a first optical cavity 14. A first light admission port 16 is disposed in the optical cavity and admits light in a first wavelength band into the first optical cavity. A first filter 18 is positioned adjacent the first light admission port 16 and filters ambient light entering and exiting a first space 20 defined about the first light admission port such that ambient light outside the first wavelength band is attenuated on entry and exit from the first space. Ambient light may be reflected into the first optical cavity 14 by the first reflector 12, for example.

In the embodiment shown, the apparatus 10 is part of an automotive lighting assembly that acts as a rear combination lamp such as for a taillight/stoplight combination of a vehicle. In this embodiment, the apparatus 10 includes a signal light assembly comprising an integral plastic mounting assembly shown generally at 22 having a flat, plastic base 24 and threaded bosses, one of which is shown at 26, for mounting the assembly to a vehicle. The assembly 22 also has a truncated paraboloidal shaped wall 28 having a surface 29 coated with a reflective coating such as an aluminum alloy, which acts as the first reflector 12. The paraboloidal shaped wall 28 extends from the flat base 24 and is generally symmetrical about an axis 27. The flat base 24 has a generally circularly shaped reflecting surface 25 coated with a reflective coating, such as an aluminum alloy similar to or the same as that on the paraboloidal shaped wall 28.

In this embodiment, the first light admission port 16 includes an elongate opening cooperating with a first colored light source 31 which in this embodiment includes a plurality of colored light emitting diodes that emit colored light in the first wavelength band. Where the assembly is used in a European vehicle, the colored light emitting diodes may include amber LEDs that emit amber colored light having a wavelength between about 575 nm and 625 nm and may further or alternatively include red colored LEDs that emit light having a wavelength between about 600 nm to about 650 nm. The first wavelength band may therefore be defined as a band containing wavelengths of about 575 nm and above, where amber and/or red LEDs are used for example, or a band containing wavelengths of at least about 600 nm and above, where only red LEDs are used.

In the embodiment shown the colored light emitting diodes of the colored light source are disposed generally in a line, centrally in the base 24 and are oriented to emit light in a direction generally parallel to the axis 27.

Figure 2:
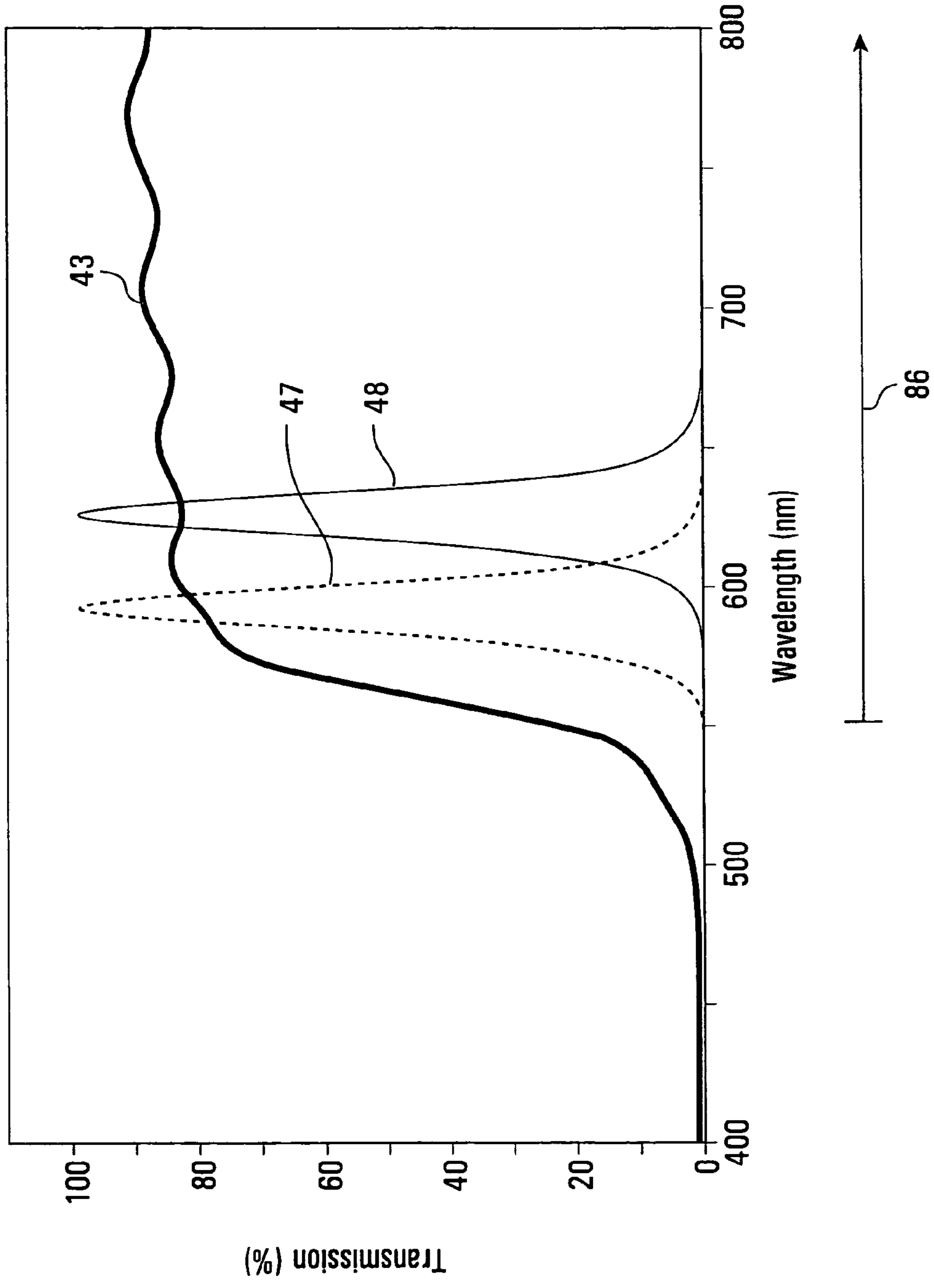
FIG. 2 is a graph of percentage transmission vs. wavelength showing a filter characteristic of a first and/or second filter shown in FIG. 1.

In the embodiment shown, the first filter 18 includes a cylindrical wall comprising an optical filter medium such as an acrylic plastic that defines the first space 20 such that light entering the first space must pass through the optical filter medium. The optical filter medium, has properties that generally permit light having wavelengths in the first wavelength band to pass through generally unattenuated and to attenuate light having wavelengths outside the first wavelength band. The first filter 18 may be a filter having a filter characteristic as shown at 43 in FIG. 2, where longer wavelengths are passed by the filter (i.e., have higher percentage transmission factors) and shorter wavelengths are attenuated (i.e., have lower % transmission factors). Light spectra 47 and 48 of amber and red LEDs, respectively, are superimposed onto the filter characteristic 43 to indicate that the first filter 18 has a cutoff wavelength shorter than a wavelength of the amber light spectrum 47.

While the present embodiment is described as being part of a tail light assembly for a vehicle, it will be appreciated that in other applications, different colored LEDs may be used and accordingly, filters with characteristics that attenuate light having wavelengths shorter than that of the colored light produced by such LEDs would be employed.

Referring back to FIG. 1, the flat base 24 has projections, only two of which are shown at 30 and 32, which project away from the base 24 generally parallel to the axis 27. The projections 30 and 32 in this embodiment serve to facilitate mounting of a stoplight assembly shown generally at 34 having a second reflector 36 positioned coaxially with the first reflector 12 and defining a second optical cavity 52 to reflect light out of the second optical cavity. The stoplight assembly 34 further includes a second light admission port 38 operably configured to admit light in a second wavelength band into the second optical cavity 52. The stoplight assembly 34 further includes a second filter 40 operably configured to filter ambient light entering and exiting a second space 50 defined about the second light admission port 38 such that ambient light outside the second wavelength band is attenuated on entry and exit from the second space.

The stoplight assembly 34 is comprised of an integral plastic member having a second base 42 having an underside 35 comprising a lower reflecting surface 44 and a truncated conical reflecting surface 46 which are positioned adjacent to and in spaced apart relation to the reflecting surface 25 when the stoplight assembly 34 is mounted to the projections 30 and 32. The lower reflecting surface 44 and truncated conical reflecting surface 46 further define the first optical cavity 14. Thus, the first optical cavity 14 is further defined between the reflecting surface 25, the paraboloidal reflecting surface 29, the lower reflecting surface 44 and truncated conical reflecting surface 46, in this embodiment.

The second base 42 also has a flat circularly shaped reflecting surface 49. The second reflector 36 includes an integral wall 41 that extends away from the second base 42 and has a second paraboloidal-shaped reflecting surface 39. The second paraboloidal-shaped reflecting surface 39 and the flat circularly shaped reflecting surface 49 further define the second optical cavity 52.

In this embodiment, the second light admission port 38 includes an elongate opening in the second base cooperating with a second colored light source 51 which includes a colored light emitting diode that emits colored light in the second wavelength band. The colored light emitting diode may emit red colored light having a wavelength between about 600 nm to about 650 nm, for example. The second wavelength band may be defined as a band containing wavelengths of about at least about 600 nm and above, in this embodiment, for example. Or the second wavelength band may be the same as the first wavelength band, i.e. 575 nm and above The first and second generally paraboloidal reflecting surfaces 29 and 39 and the first and second filters 18 and 40 are generally coaxial with each other. The first and second light sources 31 and 51 are oriented to generally direct light in a direction parallel with the axis 27.

In the embodiment shown, the second filter 40 includes a cylindrical wall comprising an optical filter medium such as an acrylic plastic that defines the second space 50 such that light entering the second space must pass through the optical filter medium. The optical filter medium, has properties that generally permit light having wavelengths in the second wavelength band to pass through generally unattenuated and to attenuate light having wavelengths outside the second wavelength band. Generally, the second filter 40 surrounds the second light admission port 38.

Operation

In operation, light from the first colored light source 31 is admitted into the first optical cavity 14 and is reflected by the lower reflecting surface 44, the reflecting surface 25 and the truncated conical reflecting surface 46 to cause it to pass through the first filter 18 and impinge upon the paraboloidal reflecting surface 29 of the first reflector 12. The paraboloidal reflecting surface 29 generally directs the first colored light in an axial direction away from the assembly. Pillow-shaped surfaces may be formed on the generally paraboloidal reflecting surface 29 to cause the light to be viewable over a wide angle.

The first filter 18 provides little or no attenuation to the amber or red colored light produced by the first colored light source 31 and therefore there is minimal loss of intensity as the first colored light passes through the first filter and exits the first optical cavity 14.

Ambient light, such as sunlight, may enter the first optical cavity 14 and impinge upon the generally paraboloidal reflecting surface 29 whereupon some of the ambient light may be reflected through the first filter 18 into the first space 20 between the underside 35 of the stoplight assembly 34 and the reflecting surface 25. Ambient light, such as sunlight, entering the first space 20, may be reflected by the lower reflecting surface 44, the truncated conical reflecting surface 46, and the reflecting surface 25, and directed through the first filter 18 to another portion of the generally paraboloidal reflecting surface 29 to exit the first optical cavity 14 in an axial direction. If the ambient light is sunlight, it has a full spectrum of wavelengths, most of which are attenuated by the first filter 18. Thus, as sunlight passes through a first portion of the first filter 18, it is attenuated and then reflected in the first space 20 and then is further attenuated as it again passes through another portion of the first filter 18, before impinging upon the other portion of the generally paraboloidal reflecting surface 29. Thus, sunlight entering the first optical cavity 14 passes through two portions of the first filter 18 and is therefore attenuated twice before exiting the first optical cavity 14. During each passage through respective portions of the first filter 18, the ambient light is attenuated by the first filter and is therefore less visible than it would be without the first filter. Since the first colored light produced by the first colored light source 31 passes through the first filter 18 only once and is attenuated only a negligible amount by the first filter, it appears noticeably brighter than ambient light reflected out of the first optical cavity 14. Thus, the first colored light exiting the first optical cavity 14 is distinguishable from ambient light simultaneously exiting the optical cavity.

The stoplight assembly 34 works in a similar manner in that ambient light incident upon the second reflecting surface 39 and directed toward an opposite portion of the second reflecting surface passes through the second filter 40 into the second space 50 bounded thereby, out through the second filter 40 and onto the opposite portion of the second reflecting surface where it is directed generally axially away from the assembly. At the same time, red colored light from the second light source 51 in the second space 50 passes through the second filter 40 only once, with minimal or no attenuation by the second filter, before impinging upon the second reflecting surface 39 where it is directed generally axially away from the stoplight assembly. The colored light directed away from the stoplight assembly 34 may be mixed with reflected ambient light reflected as described above, but due to the passes through two portions of the second filter 40 and attendant attenuation with each pass, the intensity of the reflected ambient light is reduced, making it generally less visible than the light produced by the second light source 51 and reflected by the second reflecting surface 39, rendering the light produced by the second light source more visible in the presence of reflected ambient light.

Figure 3:
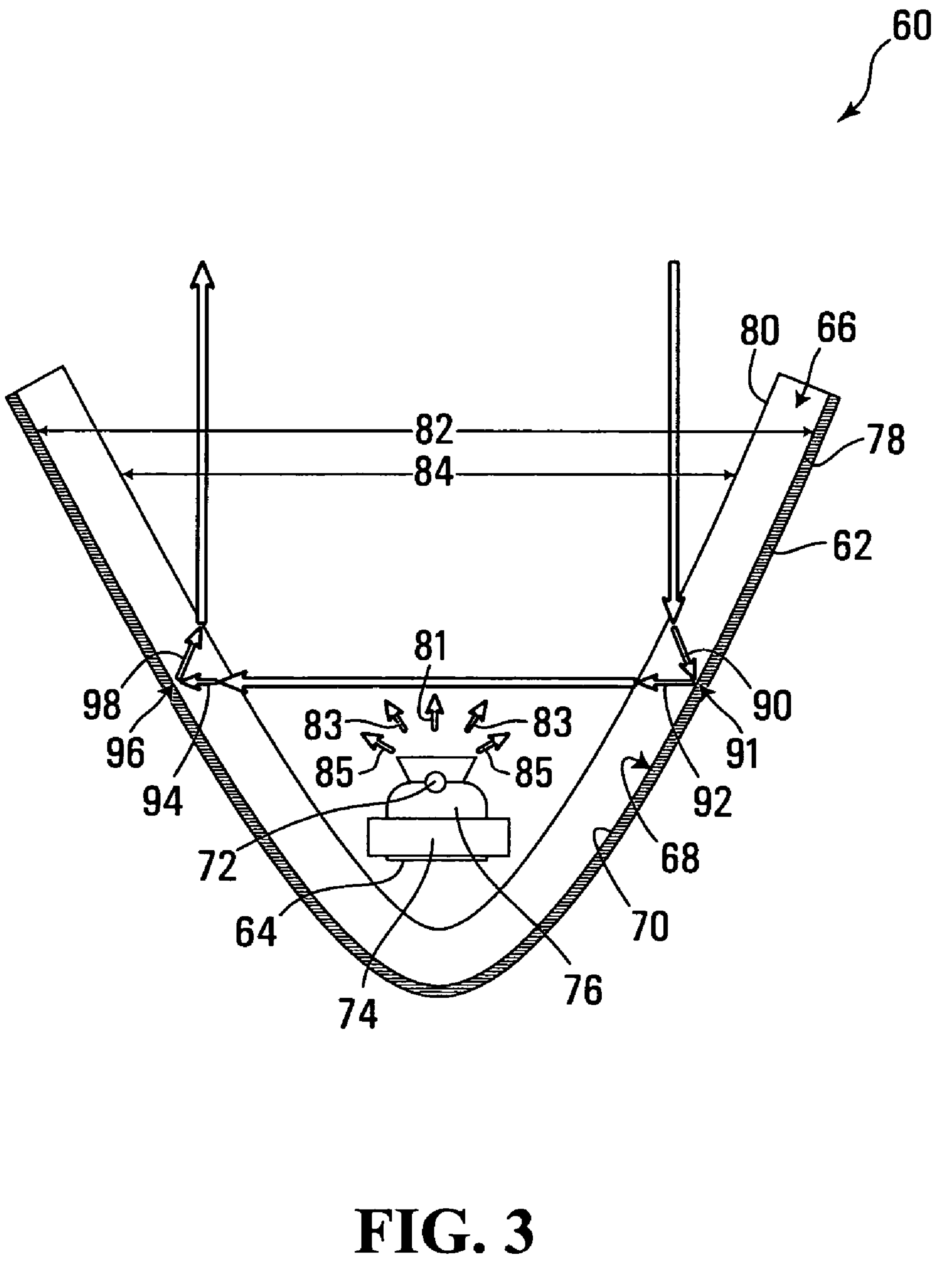
FIG. 3 is a cross-sectional view of a lighting apparatus according to a second embodiment of the invention.

Referring to FIG. 3 an apparatus according to a second embodiment of the invention is shown generally at 60. The apparatus has a first reflector 62, a first light admission port 64 and a first filter 66. In this embodiment, the reflector 62 is formed from a body having a paraboloidal surface 68 coated with a reflective coating 70 and having a focal point 72. The first light admission port 64 is located generally at the focal point 72 of the paraboloidal surface 68 and includes an LED mount 74 upon which one or more LEDs 76 may be mounted such that a primary axis of light emission is generally away from the reflector 62. In the embodiment shown there is only one LED 76 and it emits red light having a wavelength of about 650 nm.

The first filter 66 is formed from an optical filter medium comprising paraboloidal shaped colored plastic lens having a paraboloidal shaped outer surface 78 complementary to the paraboloidal surface 68 of the reflector 62 so that it fits snugly adjacent to and contacts the paraboloidal surface of the reflector. A transparent adhesive (not shown) may be used to mechanically couple the outer surface 78 of the lens to the paraboloidal surface 68 of the reflector 62 such that the outer surface faces generally away from the first light admission port. The lens has an inner surface 80 which is also generally paraboloidal in shape, similar to that of the paraboloidal surface 68 of the reflector 62, that faces generally inwardly toward the optical cavity.

The first optical cavity 82 is thus defined by the paraboloidal surface 68 of the reflector 62 and the first filter 66 is in the first optical cavity 82 and defines a first space 84 about the first light admission port 64. In this embodiment the first space 84 is therefore nearly the same size as the first optical cavity 82.

On-axis light 81 and some off-axis light 83 provided by the LED 76 and admitted into the first space 84 passes through the first space and exits the first optical cavity 82 directly without impinging upon the reflector 62. Off-axis light 85 at an angle that causes it to be incident upon the reflector 62, passes through the first filter 66 before striking the reflector and then passes through the first filter again before exiting the first space 84. However, the first filter 66 has a wavelength pass band such as shown at 86 in FIG. 2 that permits light having wavelengths within the passband to pass generally unattenuated so there is little loss of intensity of light from the light admission port 64 that is reflected by the reflector 62.

Ambient light incident on the reflector 62 from outside the first optical cavity 82 may be reflected into the first space 84 by the reflector, but such light must pass through the first filter 66 on entering the optical cavity and on exiting the optical cavity. As the ambient light passes through the first filter 66, components of the ambient light having wavelengths outside the first pass band 86 of the first filter are attenuated. Referring back to FIG. 3, ambient light passes through a first portion 90 of the first filter 66, strikes a first portion 91 of the reflector 62, then passes through a second portion 92 of the first filter before it is admitted into the first space 84. This light travels through the first space 84 generally unattenuated until it passes through a third portion 94 of the first filter 66, strikes a second portion 96 of the reflector 62, passes through a fourth portion 98 of the first filter 66 and finally exits the optical cavity 82. This results in multiple filtering of the ambient light directed at the optical cavity 82, causing most ambient light entering the optical cavity to be significantly attenuated before exiting the optical cavity while most light admitted into the optical cavity through the light admission port 64, including off-axis light that impinges upon the reflector 62 passes out of the optical cavity with little or no attenuation. Therefore, the light produced by the LED 76 is not washed out in ambient light and is generally distinguishable therefrom.

Figure 4:
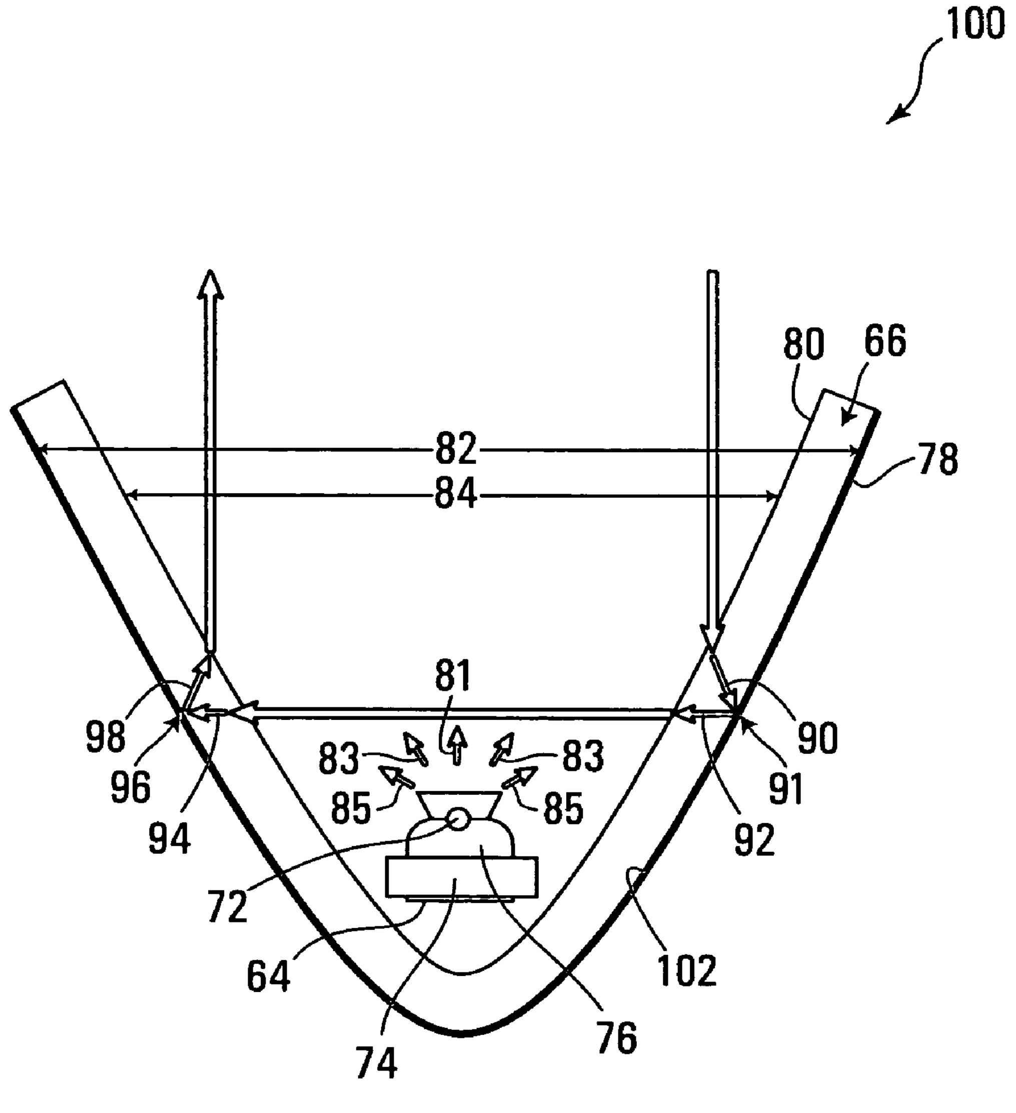
FIG. 4 is a cross-sectional view of a lighting apparatus according to a third embodiment of the invention.

Referring to FIG. 4, an apparatus according to a third embodiment of the invention is shown generally at 100. All of the components of this embodiment are the same as those shown in FIG. 3, with the exception that the reflector (62 in FIG. 3) is replaced with a reflective coating 102 on the paraboloidal shaped outer surface 78 of the first filter 66. The apparatus functions generally as described above in connection with the embodiment shown in FIG. 3 with the exception that that ambient light impinging upon the inner surface 80 of the first optical filter passes through the filter and is then reflected back through the filter by a reflective coating on the outer surface 78 of the filter.

The embodiment shown in FIG. 4 may be less expensive to fabricate than the embodiment shown in FIG. 3 since a separate structure is not used for the reflector.

While specific embodiments of the invention have been described and illustrated, such embodiments should be considered illustrative of the invention only and not as limiting the invention as construed in accordance with the accompanying claims.

What is claimed is:

1. A process for producing distinguishable light, in the presence of ambient light, the process comprising:

admitting light in a first wavelength band through a first light admission port into a first optical cavity at least partially defined by a first reflector operably configured to reflect light out of said first optical cavity; and filtering ambient light entering and exiting a first space defined about said first light admission port such that ambient light outside said first wavelength band is attenuated on entry and exit from said first space, wherein filtering comprises causing ambient light reflected into said space to pass through a filter surrounding said space, wherein causing ambient light to pass through a filter comprises causing said ambient light to pass through a filter positioned between said reflector and said light admission port.

2. The process of claim 1 wherein admitting light comprises admitting light from a light emitting diode in said space.

3. The process of claim 1 wherein filtering comprises causing ambient light reflected into said space to pass through a filter defining said space.

4. The process of claim 1 wherein causing ambient light to pass through a filter comprises causing ambient light impinging upon an inner surface of an optical filter medium extending about said first light admission port to pass through said medium and be reflected back through said medium by a reflective coating on an outer surface of said medium.

5. The process of claim 4 wherein causing ambient light to pass through a filter comprises causing said ambient light to pass through a filter having a shape generally complementary to said reflector.

6. The process of claim 5 wherein causing ambient light to pass through a filter comprises causing said ambient light to pass through a filter having a surface in contact with a surface of said reflector.

7. The process of claim 1 wherein causing ambient light to pass through a filter comprises causing said ambient light to pass through a filter adjacent said light admission port.

8. The process of claim 1 further comprising:

admitting light in a second wavelength band through a second light admission port into a second optical cavity at least partially defined by a second reflector operably configured to reflect light out of said second optical cavity; and filtering ambient light reflected into said second optical cavity and entering and exiting a second space defined about said second light admission port such that ambient light outside said second wavelength band is attenuated on entry and exit from said second space.

9. The process of claim 8 wherein admitting light in said first and second wavelength bands comprises admitting light into first and second optical cavities positioned generally coaxially with each other.

10. An apparatus for producing distinguishable light, in the presence of ambient light, the apparatus comprising:

a first reflector at least partially defining a first optical cavity, said first reflector being operably configured to reflect light out of said first optical cavity;

a first light admission port operably configured to admit light in a first wavelength band into said first optical cavity; and a first filter operably configured to filter ambient light entering and exiting a first space defined about said first light admission port such that ambient light outside said first wavelength band is attenuated on entry and exit from said first space, wherein said first filter surrounds said first space, wherein said first filter is positioned between said reflector and said first light admission port.

11. The apparatus of claim 10 further comprising a first light emitting diode in said first light admission port for emitting said light in said first wavelength band into said first space.

12. The apparatus of claim 10 wherein said first filter defines said first space.

13. The apparatus of claim 10 wherein said first filter is positioned adjacent said first reflector.

14. The apparatus of claim 13 wherein said first filter has a first shape generally complementary to said first reflector.

15. The apparatus of claim 14 wherein said first filter has a first surface in contact with a surface of said first reflector.

16. The apparatus of claim 10 wherein said first filter is positioned adjacent said first light admission port.

17. The apparatus of claim 10 wherein said first filter comprises a first optical medium.

18. The apparatus of claim 10 wherein said first filter comprises a first optical filter medium extending about said first light admission port and having a first outer surface facing generally away from said first light admission port.

19. The apparatus of claim 18 wherein said first outer surface has a generally paraboloidal shape.

20. The apparatus of claim 19 wherein said first reflector includes a first reflective coating on said first outer surface such that ambient light impinging upon an inner surface of said first optical filter medium passes through said medium and then is reflected back through said medium by said first reflective coating.

21. The apparatus of claim 10 further comprising:

a second reflector positioned coaxially with said first reflector, said second reflector at least partially defining a second optical cavity, said second reflector being operably configured to reflect light out of said second optical cavity;

a second light admission port operably configured to admit light in a second wavelength band into said second optical cavity a second filter operably configured to filter ambient light entering and exiting a second space defined about said second light admission port such that ambient light outside said second wavelength band is attenuated on entry and exit from said second space.

22. The apparatus of claim 21 further comprising a second light emitting diode in said second light admission port for emitting said light in said second wavelength band into said second space.

23. The apparatus of claim 21 wherein said second filter defines said second space.

24. The apparatus of claim 21 wherein said second filter surrounds said second space.

25. The apparatus of claim 24 wherein said second filter is positioned between said second reflector and said second light admission port.

26. The apparatus of claim 25 wherein said second filter is positioned adjacent said second light admission port.

27. The apparatus of claim 21 wherein said second filter comprises a second optical medium.

28. An apparatus for producing distinguishable light, in the presence of ambient light, the apparatus comprising:

first reflecting means at least partially defining a first optical cavity, for reflecting light out of said first optical cavity;

first admitting means for admitting light in a first wavelength band into said first optical cavity, wherein said first admitting means comprises a first light emitting diode; and first attenuating means for attenuating ambient light entering and exiting a first space defined about said first admitting means, wherein said first attenuating means defines said first space, and wherein said first attenuating means comprises a first filter that surrounds said first space, wherein said first filter is positioned between said first reflecting means and said light emitting diode.

29. The apparatus of claim 28 wherein said first attenuating means comprises a first optical filter medium extending about said first admitting means and having a first outer surface facing generally away from said first admitting means.

30. The apparatus of claim 29 wherein said first outer surface has a generally paraboloidal shape.

31. The apparatus of claim 30 wherein said first reflecting means includes a first reflective coating on said first outer surface such that ambient light impinging upon an inner surface of said first optical filter medium passes through said medium and then is reflected back through said medium by said first reflective coating.

32. The apparatus of claim 28 wherein said first filter is positioned adjacent said first light emitting diode.

33. The apparatus of claim 28 wherein said first filter comprises a first optical medium.

34. The apparatus of claim 28 further comprising:

second reflecting means at least partially defining a second optical cavity and operably configured to reflect light out of said second optical cavity;

second admitting means for admitting light in a second wavelength band into said second optical cavity; and second attenuating means for attenuating ambient light entering and exiting a second space defined about said second admitting means.

35. The apparatus of claim 34 wherein said second means for admitting comprises a second light emitting diode.

36. The apparatus of claim 35 wherein said second attenuating means defines said second space.

37. The apparatus of claim 36 wherein said second attenuating means comprises a second filter that surrounds said second space.

38. The apparatus of claim 37 wherein said second filter is positioned between said second reflecting means and said light emitting diode.

39. The apparatus of claim 38 wherein said second filter is positioned adjacent said second light emitting diode.

40. The apparatus of claim 37 wherein said second filter comprises a second optical medium.

* * * * *